March 23, 1926.
G. T. BUDDLE
FISH LURE
Filed March 9, 1925
1,578,070
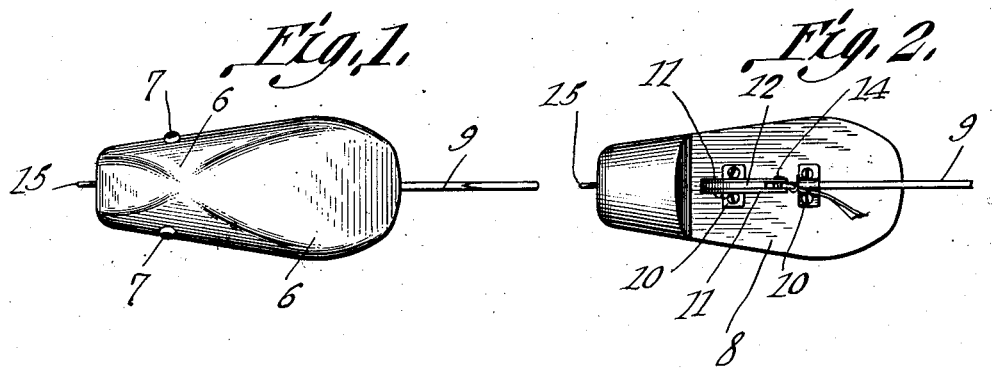
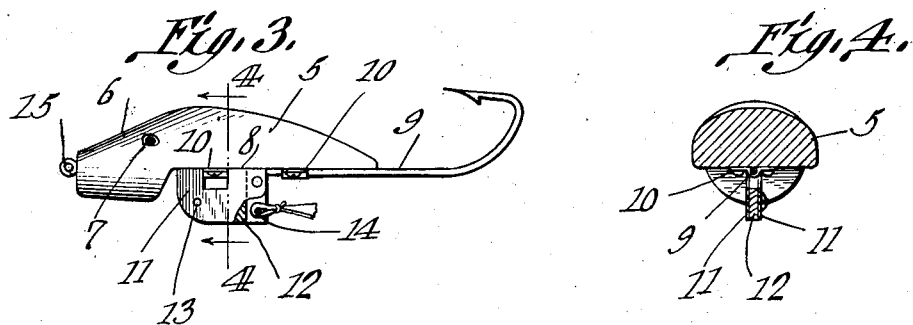
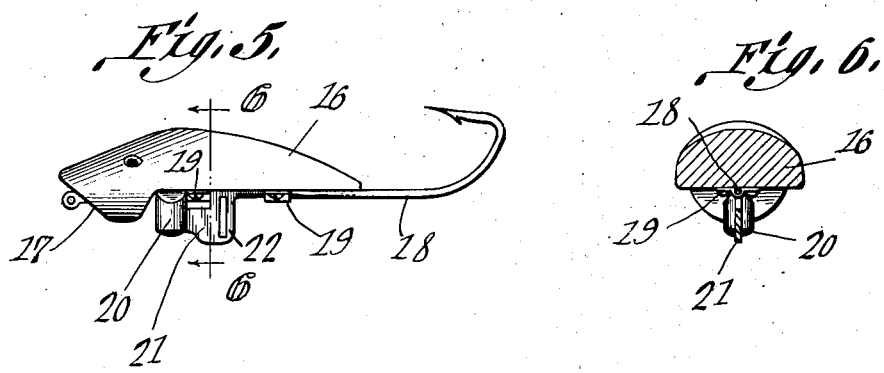
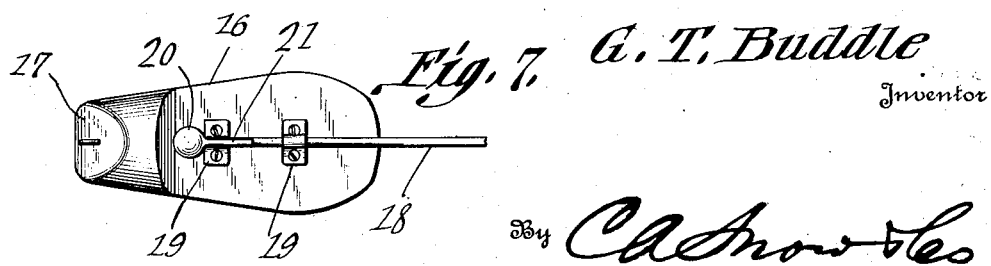
G. T. Buddle
Inventor Patented Mar. 23, 1926.

1,578,070

UNITED STATES PATENT OFFICE.

GEORGE T. BUDDLE, OF CHICAGO, ILLINOIS, ASSIGNOR OF ONE-HALF TO JULIUS J. STURM, OF CHICAGO, ILLINOIS.

FISH LURE.

Application filed March 9, 1925. Serial No. 14,184.

*To all whom it may concern:*

Be it known that I, GEORGE T. BUDDLE, a citizen of the United States, residing at Chicago, in the county of Cook and State of Illinois, have invented a new and useful Fish Lure, of which the following is a specification.

This invention relates to artificial bait or fish lures, the primary object of the invention being to provide novel means wherein the usual pork rind used as bait may be readily and easily secured, eliminating any possibility of the pork rind becoming accidentally displaced.

Another important object of the invention is to provide a device of this character which will simulate a bug or other insect employed as bait.

A still further object of the invention is the provision of means to insure the body portion of the device being held in an upright position while it is being drawn through the water by the fisherman.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a plan view of a fish lure constructed in accordance with the invention.

Figure 2 is a bottom plan view thereof.

Figure 3 is a side elevational view of the fish lure.

Figure 4 is a sectional view taken on line 4—4 of Figure 3.

Figure 5 is a side elevational view of a modified form of the invention.

Figure 6 is a sectional view taken on line 6—6 of Figure 5.

Figure 7 is a bottom plan view of the modified form of fish lure.

Referring to the drawing in detail, the reference character 5 indicates the body portion of the device which is substantially oval in plan, the same being provided with a bulged upper surface 6 and eyes 7, so that the device will simulate a bug.

The under portion of the body 5 is cut away as at 8 to permit the hook and bait securing member to be secured to the body portion. The hook is indicated by the reference character 9 and is secured to the under surface of the body portion, by means of the securing straps 10 one of which straps extends through the cut out portion 10' of the plates 11 in a manner to permit the hook to rock within the straps that embrace portions of the hook as clearly shown by Figure 3 of the drawing.

Secured to the forward end of the hook 9 to move therewith are the spaced plates 11 between which the weight 12 is secured, pins 13 being provided for securing the weight in position.

As shown by Figure 3 of the drawing, the weight 12 has its rear edge disposed in spaced relation with the rear edges of the plates 11, the rear edges being connected by means of the pin 14, around which pin the pork rind may be secured.

An eye indicated at 15 is secured at the forward end of the body portion and affords means whereby a suitable fishing line may be attached to the device. In this form of the invention, the plates 11 are formed by bending a length of sheet metal intermediate its ends, the bent portions thereof being positioned around the shank of the hook and secured preferably by soldering the same in position.

In the latter form of the invention, the plate 21 that carries the weight 20 is secured to the shank of the hook by soldering the weight to the shank.

With regard to the eye of the shank of the hook, will say that the hooks forming a part of the present invention, are constructed without eyes.

The modified form of the invention includes a body portion 16 which is also constructed to simulate a bug, the front under surface of the body being cut away as at 17 so that as the device is drawn through the water, the surface 17 of the body portion will tend to force the device upwardly to the surface of the water.

In this form of the invention the hook is indicated at 18, the same being pivotally supported under the body portion by means of the metallic straps 19 to permit the hook to rock in a horizontal plane. At the forward end of the hook 18 is a weight 20 which normally holds the pointed portion of the hook in an upright position as illustrated by Figure 5.

Disposed at the rear of the weight, is a plate 21, which is formed with an elongated opening 22 through which the pork rind may be positioned to secure it to the device.

I claim:—

1. An artificial bait comprising a body portion, a hook member pivotally supported under the body portion, a weight connected with the hook member for normally holding the hook member in its active position, and said weight having an opening to receive bait.

2. An artificial bait comprising a body portion, the under surface of the body portion being cut away to provide a supporting surface, a hook member pivotally mounted under the body portion, a weight connected with the hook member, and adapted to hold the hook member in its active position, a plate connected with the weight and having an elongated opening, and said opening adapted to accommodate bait.

3. An artificial bait comprising a body portion, a hook member pivotally supported under the body portion, a weight connected with the hook member, said weight adapted to normally hold the hook member in its active position, and said weight having means to permit bait to be secured thereto.

In testimony that I claim the foregoing as my own, I have hereto affixed my signature.

GEORGE T. BUDDLE.